United States Patent [19]
Tamulevich et al.

[11] 3,815,506
[45] June 11, 1974

[54] RUBBER CELLULOSIC TAPE SANDWICH INHIBITOR

[75] Inventors: Thomas W. Tamulevich, Worcester, Mass.; Ivan L. Tominack, Indian Head, Md.

[73] Assignee: The United States of America as represented by the Secretary of the Navy, Washington, D.C.

[22] Filed: Mar. 16, 1972

[21] Appl. No.: 235,213

[52] U.S. Cl. .............................................. 102/103
[51] Int. Cl. ............................................. F42b 1/00
[58] Field of Search ................ 102/103, 49.3–49.8, 102/34–34.5; 60/253–256; 149/3, 14

[56] References Cited
UNITED STATES PATENTS
2,643,611  6/1953  Ball.................................. 102/103
3,157,127  11/1964  Proell............................... 102/103

Primary Examiner—Robert F. Stahl
Attorney, Agent, or Firm—R. S. Sciascia; J. A. Cooke; Donn McGiehan

[57] ABSTRACT

A method and article for inhibiting nitrate ester migration and plasticizer migration in solid propellants by encasing the solid propellant fuel grain in a laminated wrap material having a layer of silicone rubber sandwiched between layers of cellulosic material such as ethyl cellulose.

5 Claims, 2 Drawing Figures

PATENTED JUN 11 1974 3,815,506

RUBBER CELLULOSIC TAPE SANDWICH INHIBITOR

BACKGROUND OF THE INVENTION

The invention relates generally to improved packaging of solid propellant fuel and more particularly to a method and article for inhibiting nitrate esters found in solid propellant fuel grains from migrating into an encasing material, and for inhibiting the plasticizer of the encasing material from migrating into the solid propellant fuel grains.

Heretofore, the solid propellant industry has used cellulosic wrapping materials such as cellulose acetate for inhibiting nitrate ester migration from the cast and extruded double-base solid propellant fuel grains. However, there are several disadvantages in that cellulosic inhibiting materials possess an affinity for nitrate esters contained in solid propellant grains with a resulting tendency for the nitrate esters to diffuse from the propellant to the inhibitor. Also it has been noticed that there is diffusion of the plasticizers present in the inhibitor wrap into the propellant.

This migration of the nitrate esters from the propellant into the inhibitor is detrimental in many ways. For example, nitrate ester migration into the inhibitor reduces its concentration in the propellant thus reducing performance. Nitrate ester migration causes a severe safety hazard because it is explosive and likely to pocket in the propellant inhibitor. Further, nitrate ester migration from the solid propellant fuel grains may cause the inhibitor jacket to unbond from the outer surface of the grain resulting in unpredictable performance of the propellant. In the past, it has been found necessary to use a substantial thickness of cellulosic material to achieve adequate inhibiting of the nitrate ester migration which obviously increases the inner weight and bulk, and decreases the amount of propellant available in the motor. It is also known that the cellulosic material used in the past does not provide satisfactory thermal insulation to protect the propellant from the high temperatures encountered during transportation under an aircraft wing or while being boosted in a multi-stage missile.

SUMMARY OF THE INVENTION

Accordingly, an object of the present invention is to provide a method of inhibiting migration of nitrate esters from a solid propellant fuel grain.

Another object of the instant invention is to provide an encasing material for solid propellant fuel grains which reduces nitrate ester migration.

A further object of the invention is to provide a laminate material that is impervious to nitrate esters, is thin, and provides thermal insulation qualities.

A still further object of the instant invention is to provide a solid propellant fuel grain wrapped with a compatible protective laminate.

Briefly, these and other objects of the present invention are attained by encasing the solid propellant fuel grain in a laminated inhibitor wrap that possesses little affinity for nitrate esters which diffuse from the propellant, and that will not diffuse plasticizers present in the inhibitor into the propellant. The inhibitor wrap is a sandwich-like structure or a laminate comprising outer layers of low acetyl cellulose acetate, or ethyl cellulose having a layer therebetween of silicon rubber fuzed or bonded to the outer layers. The laminate may be made in the form of a tape that is helically wound and bonded to the outer surface of the solid propellant fuel grain.

BRIEF DESCRIPTION OF THE DRAWINGS

A more complete understanding of the invention and many of the attendant advantages thereof will be readily appreciated as the same becomes better understood by reference to the following detailed description when considered in connection with the accompanying drawings, wherein.

DESCRIPTION OF THE PREFERRED EMBODIMENT

Figure 1:
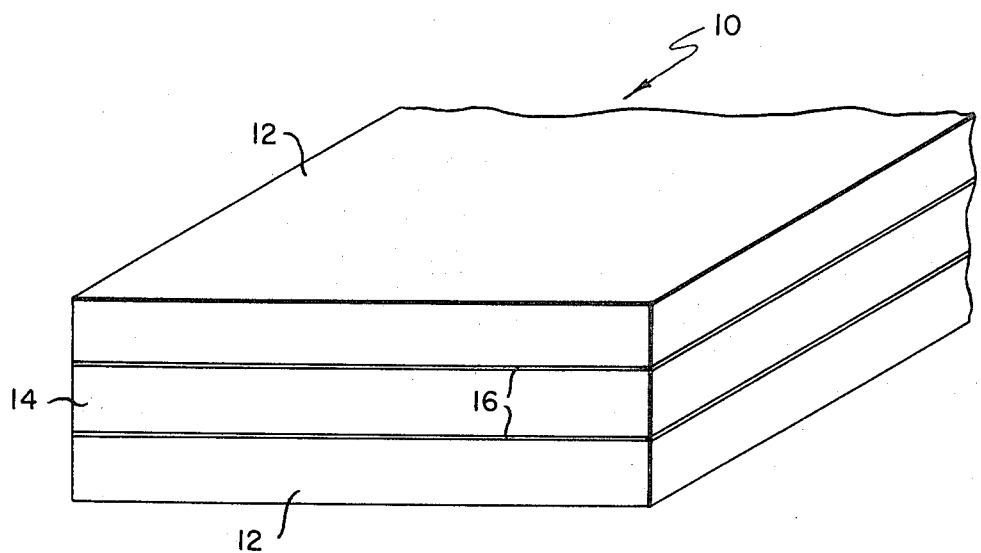
FIG. 1 is an enlarged isometric view of the edge of the laminate.

Referring now to the drawings, wherein like reference numeral designate corresponding parts in the several views, there is shown in FIG. 1 a laminate inhibitor 10. The outer layers 12 may be composed of a variety of cellulosic materials such as for example, low acetyl cellulose acetate, or ethyl cellulose. Sandwiched between the outer layers 12 is an inner layer 14 made of silicon rubber such as, for example, General Electric Type "TBS 758." The interfaces 16 indicate the areas of the cellulosic material which may be primed with a chemical primer such as, for example, General Electric Type "SS 4155," to provide an adequate bond between the cellulosic material 12 and the silicon rubber inner layer 14.

Due to the great difference in the physical and chemical properties of the cellulose film and the silicon rubber, in the past it has been found extremely difficult to laminate them with an adequate bond. Therefore, the following explanation is offered of the procedure used to make the laminate according to this invention which provides an excellent bond between the cellulose film and the silicon rubber therebetween.

The cellulose film 12 is wetted with a primer such as General Electric "SS 4155" diluted with dry isopropyl alcohol; and causes the cellulose to become softened. Silicon rubber such as, for example, General Electric Type "TBS 758" which is in the form of a viscous liquid in the uncured state, is flowed on or otherwise applied to the primed surface 16 of the cellulose acetate 12. Another piece of cellulose film 12, primed on one side 16, is applied over the fluid silicon rubber 14. The sandwich is then calendered between rollers to spread the silicon rubber 14 evenly and to provide an even thickness. The laminate 10 is then cured in an oven at 100°F for approximately 24 hours. This process results in a laminated tape 10 which may be approximately 2 inches wide and approximately 0.030 inches thick and in any desirable length.

Figure 2:
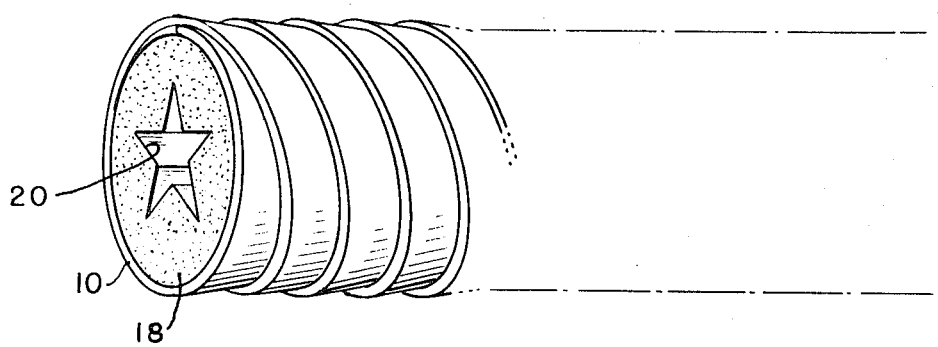
FIG. 2 is an isometric view of a solid propellant fuel grain wrapped with the laminate according to this invention.

Referring now to FIG. 2, there is shown the laminate 10 helically wound on a cylindrical solid propellant fuel grain 18. The solid propellant fuel grain 18 is been shown as having a cylindrical outer surface and a star shape inner surface 20 where burning occurs.

The cellulose film-rubber laminate tape inhibitor is used primarily on double-base solid propellant fuel grains. The inhibitor, in the form of a tape perhaps 2 inches wide, is helically wrapped onto an extruded propellant grain as shown in FIG. 2 using an appropriate solvent system such as ethyl lactate or butyl acetate designed to bond the inhibitor to the propellant grain. Cast double-base propellant grains may be inhibited with this tape or by the use of wide laminate sheets encasing the propellant grain and adhered by the solvent system discussed above.

Obviously numerous modifications and variations of the present invention are possible in light of the above teachings. It is therefore to be understood that within the scope of the appended claims the invention may be practiced otherwise than as specifically described.

What is claimed as new and desired to be secured by Letters Patent of the United States is:

1. An inhibited fuel grain comprising:
   a solid propellant fuel grain; and
   a laminar inhibitor wrapped over the external surfaces of said solid propellant fuel grain comprising:
   a first layer of cellulosic film having an interface surface primed for bonding;
   a second layer of cellulosic film having an interface primed for bonding; and
   an intermediate layer of silicon rubber therebetween bonded to said first and second layers at the primed interfaces.

2. The inhibited fuel grain of claim 1 wherein said layers of cellulosic film are made of ethyl cellulose and said layer of silicone rubber is made of methyl phenyl silicone.

3. The inhibited fuel grain of claim 2 wherein said laminar inhibitor is wrapped and adhesively bonded to the external surface of said fuel grain.

4. The inhibited fuel grain of claim 3 wherein said bond is solvent-induced.

5. The inhibited fuel grain of claim 4 wherein said solvent is a ethyl lactate-butyl acetate mixture.

* * * * *